United States Patent
Halbert et al.

(10) Patent No.: US 10,903,719 B2
(45) Date of Patent: Jan. 26, 2021

(54) MODULAR POWER SYSTEM WITH MECHANICAL COOLING

(71) Applicant: MTU Onsite Energy Corporation, Mankato, MN (US)

(72) Inventors: Mark Halbert, Madison Lake, MN (US); Dylan Brandt, Woden, IA (US); JD Carsten, Saint Peter, MN (US)

(73) Assignee: MTU Onsite Energy Corporation, Mankato, MN (US)

( * ) Notice: Subject to any disclaimer, the term of this patent is extended or adjusted under 35 U.S.C. 154(b) by 53 days.

(21) Appl. No.: 15/666,816

(22) Filed: Aug. 2, 2017

(65) Prior Publication Data

US 2019/0044412 A1    Feb. 7, 2019

(51) Int. Cl.

| | | |
|---|---|---|
| *H02K 7/18* | (2006.01) | |
| *H02K 9/06* | (2006.01) | |
| *F04D 25/08* | (2006.01) | |
| *H02K 9/04* | (2006.01) | |
| *F04D 25/02* | (2006.01) | |
| *F04D 19/00* | (2006.01) | |
| *F04D 29/053* | (2006.01) | |
| *F04D 25/04* | (2006.01) | |

(52) U.S. Cl.
CPC .......... *H02K 7/1815* (2013.01); *F04D 19/002* (2013.01); *F04D 25/02* (2013.01); *F04D 25/08* (2013.01); *H02K 9/04* (2013.01); *H02K 9/06* (2013.01); *F04D 25/04* (2013.01); *F04D 29/053* (2013.01); *H02K 2213/03* (2013.01)

(58) Field of Classification Search
CPC .......... H02K 7/1815; H02K 9/06; H02K 9/04; F04D 25/08; F04D 19/002; F04D 25/02
See application file for complete search history.

(56) References Cited

U.S. PATENT DOCUMENTS

| | | | | |
|---|---|---|---|---|
| 2,733,661 | A | * | 2/1956 | Surgi ..................... F02B 63/04 280/63 |
| 4,548,164 | A | * | 10/1985 | Ylonen ................. F02B 63/04 123/195 C |
| 4,883,024 | A | * | 11/1989 | Ito ............................ F01P 5/02 123/41.7 |

(Continued)

FOREIGN PATENT DOCUMENTS

WO    WO-2016176701 A1 * 11/2016  ............. F01P 11/12

OTHER PUBLICATIONS

Interpower—Container Generators, Retrieved from www.interpower.co.uk on Jun. 20, 2017, 2 pgs.

(Continued)

*Primary Examiner* — Viet P Nguyen
(74) *Attorney, Agent, or Firm* — Shumaker & Sieffert, P.A.

(57) ABSTRACT

A containerized generator set comprises a container, a generator set, a radiator, and a cooling fan. The generator set, radiator, and cooling fan are disposed within an interior volume defined by the container. The interior volume has a length, width, and height. The generator set comprises an engine and a generator. The cooling fan is mechanically coupled to the engine, and the cooling fan has a diameter that is substantially the same as the width of the interior volume. The cooling fan may further have a swept cross-sectional area that is at least 60% of the cross-sectional area of the interior volume.

11 Claims, 7 Drawing Sheets

(56) References Cited

U.S. PATENT DOCUMENTS

| | | | | |
|---|---|---|---|---|
| 4,992,669 A * | 2/1991 | Parmley | ............... | F01B 1/12 |
| | | | | 123/2 |
| 5,778,832 A * | 7/1998 | King | ............... | F01P 3/18 |
| | | | | 123/2 |
| 6,450,133 B1 * | 9/2002 | Bernard | ............... | F01P 5/04 |
| | | | | 123/2 |
| 6,765,304 B2 | 7/2004 | Baten et al. | | |
| 7,007,966 B2 | 3/2006 | Campion | | |
| 8,037,966 B2 * | 10/2011 | Errera | ............... | F01N 5/04 |
| | | | | 181/203 |
| 8,294,285 B2 | 10/2012 | Hunter | | |
| 8,495,869 B2 | 7/2013 | Beissler et al. | | |
| 8,816,518 B2 | 8/2014 | Campion et al. | | |
| 2003/0011196 A1 * | 1/2003 | Kern | ............... | F02B 63/04 |
| | | | | 290/1 A |
| 2006/0055193 A1 * | 3/2006 | Colborne | ............... | B60P 3/14 |
| | | | | 296/24.3 |
| 2008/0048456 A1 * | 2/2008 | Browning | ............... | H02K 7/1823 |
| | | | | 290/1 A |
| 2008/0055846 A1 * | 3/2008 | Clidaras | ............... | G06F 1/20 |
| | | | | 361/679.41 |
| 2009/0194041 A1 * | 8/2009 | Lobsiger | ............... | F02D 29/06 |
| | | | | 123/2 |
| 2010/0072757 A1 * | 3/2010 | Kealy | ............... | F01N 13/04 |
| | | | | 290/1 A |
| 2010/0080677 A1 * | 4/2010 | Heinzen | ............... | B65G 53/24 |
| | | | | 414/298 |
| 2012/0181795 A1 | 7/2012 | Lobsiger | | |
| 2016/0230654 A1 * | 8/2016 | Shatek | ............... | H02K 7/1815 |
| 2018/0128156 A1 * | 5/2018 | Watson | ............... | F01P 11/12 |
| 2018/0354712 A1 * | 12/2018 | Goleczka | ............... | B65D 85/68 |

OTHER PUBLICATIONS

Off-grid Power Systems Built Into Standard ISO Containers, Retrieved from www.powerguard.co.uk on Jun. 20, 2017, 4 pgs.

* cited by examiner

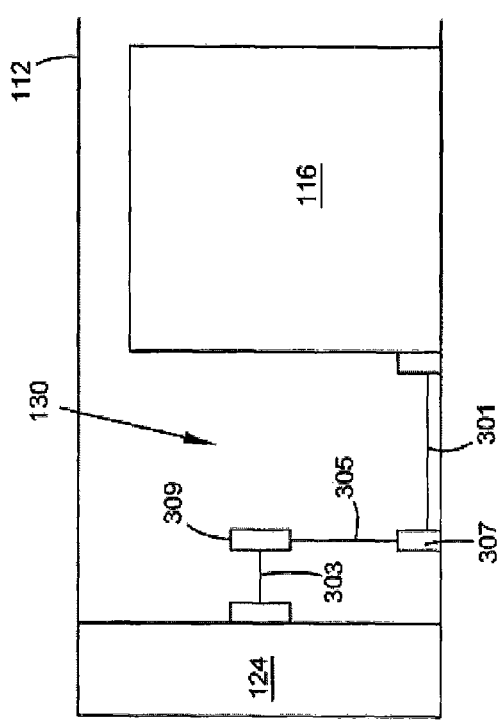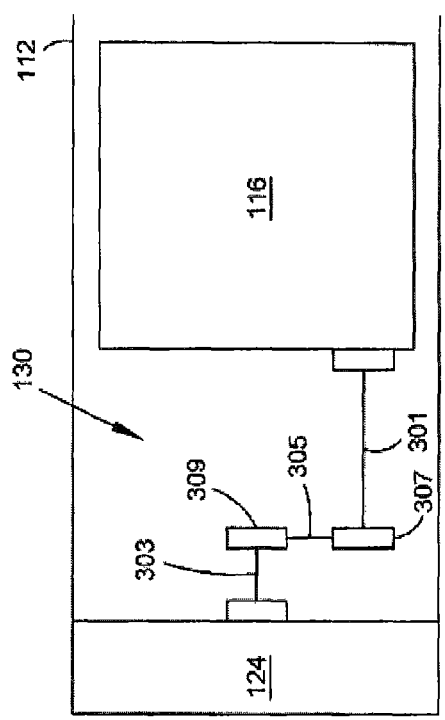

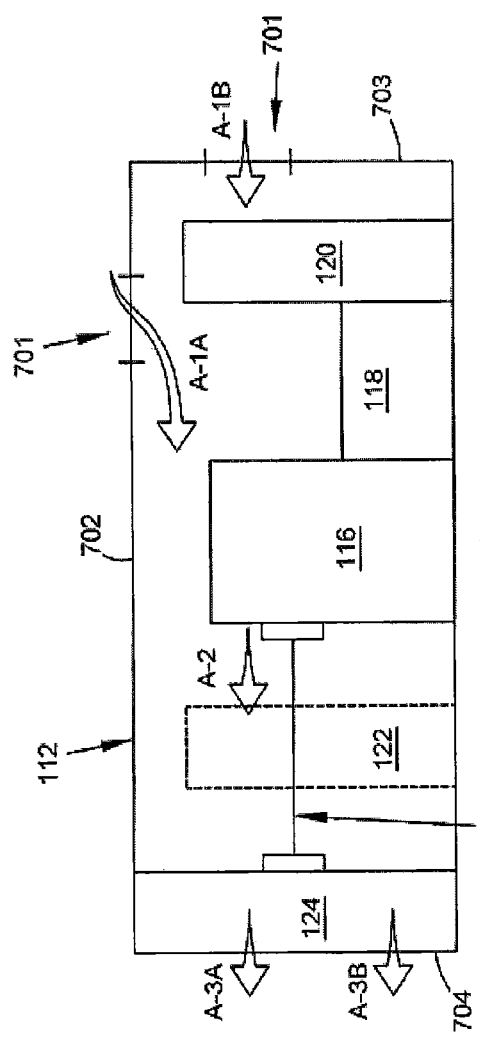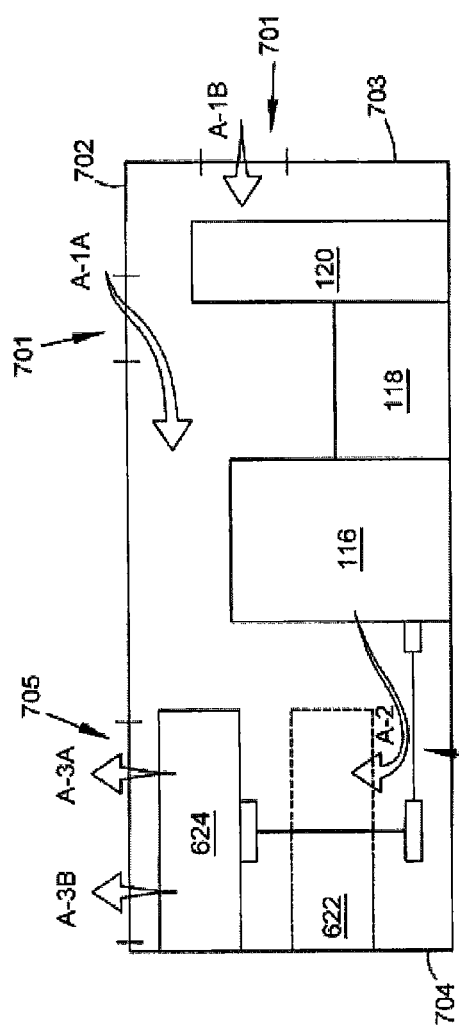

MODULAR POWER SYSTEM WITH MECHANICAL COOLING

FIELD OF THE DISCLOSURE

The present disclosure relates generally to electric generators, and more specifically to cooling systems for modular electric generators packaged in shipping containers.

BACKGROUND

Portable, modular electric generator sets may be used on occasions when temporary or permanent electrical power is required. A typical configuration includes a gaseous- or liquid-fueled engine (such as a diesel fueled engine) coupled to an electric generator and enclosed in a shipping container. One such configuration is presented in FIG. 1. A containerized generator set 10 comprise a container 12 and a generator set 14. In the illustrated configuration, the container 12 is a rail car. Generator set 14 comprises an engine 16 and generator 18, each disposed within the container 12. In FIG. 1, the engine 16 is a liquid-fueled diesel generator. An engine-generator control panel 20 is further disposed in the container.

The generator set 14, and more specifically the engine 16, is cooled by a radiator 22 in fluid communication with an engine cooling jacket 26. Electrically-driven cooling fans 24 ensure sufficient air flow over the radiator 22 to maintain coolant temperature at or below a desired temperature. Cooling fans 24 draw air into the container 12 through air inlets (not shown in FIG. 1) and exhaust the air vertically through an air outlet (not shown in FIG. 1).

The optimal design of containerized generator sets is complex due to considerations such as space constraints, maximum regulated noise levels, ease of assembly, service access, fuel storage, reliability, and preventing recycling of exhaust gases into the air intakes.

SUMMARY

In accordance with some embodiments of the present disclosure, a system for generating electrical power is provided. The system may comprise a container, a generator set, and a fan. The container may define an interior volume having a length, width, and height. The generator set may be disposed within the interior volume. The fan may be disposed within the interior volume and may be mechanically coupled to said generator set. The fan may have a swept cross-sectional area comprising a circle through which a fan blade passes during fan operation. The swept cross-sectional area is at least 50% of the cross-sectional area of the interior volume.

In accordance with some embodiments of the present disclosure, a system for generating electrical power is provided. The system may comprise a container, a generator set, and a fan. The container may define an interior volume. The generator set may be disposed within the interior volume. The generator set may have a driveshaft that defines a first axis of rotation. The fan may be disposed within the interior volume and may be mechanically coupled to the driveshaft of the generator set. The fan may have a second axis of rotation, wherein the second axis of rotation is offset from the first axis of rotation.

In accordance with some embodiments of the present disclosure, a system for generating electrical power is provided. The system may comprise a first containerized generator and a second containerized generator stacked on top of the first containerized generator, wherein the first containerized generator and the second containerized generator share a common, vertically-oriented exhaust duct. The first containerized generator may comprise a container, a generator set, and a fan. The container may define an interior volume. The generator set may be disposed within the interior volume. The fan may be disposed within the interior volume and may be mechanically coupled to the generator set. The second containerized generator may comprise a container, a generator set, and a fan. The container may define an interior volume. The generator set may be disposed within the interior volume. The fan may be disposed within the interior volume and may be mechanically coupled to the generator set.

BRIEF DESCRIPTION OF THE DRAWINGS

The following will be apparent from elements of the figures, which are provided for illustrative purposes and are not necessarily to scale.

FIG. 5A is a cross-sectional partial side view of one configuration of a mechanical linkage between an engine and a cooling fan in accordance with some embodiments of the present disclosure.

FIG. 5B is a cross-sectional partial top view of one configuration of a mechanical linkage between an engine and a cooling fan in accordance with some embodiments of the present disclosure.

FIG. 7 is a schematic, cross-sectional side view of the air flow through a containerized generator set having a vertically mounted and mechanically driven cooling fan in accordance with some embodiments of the present disclosure.

FIG. 8 is a schematic, cross-sectional side view of the air flow through a containerized generator set having a horizontally mounted and mechanically driven cooling fan in accordance with some embodiments of the present disclosure.

Figure 1:
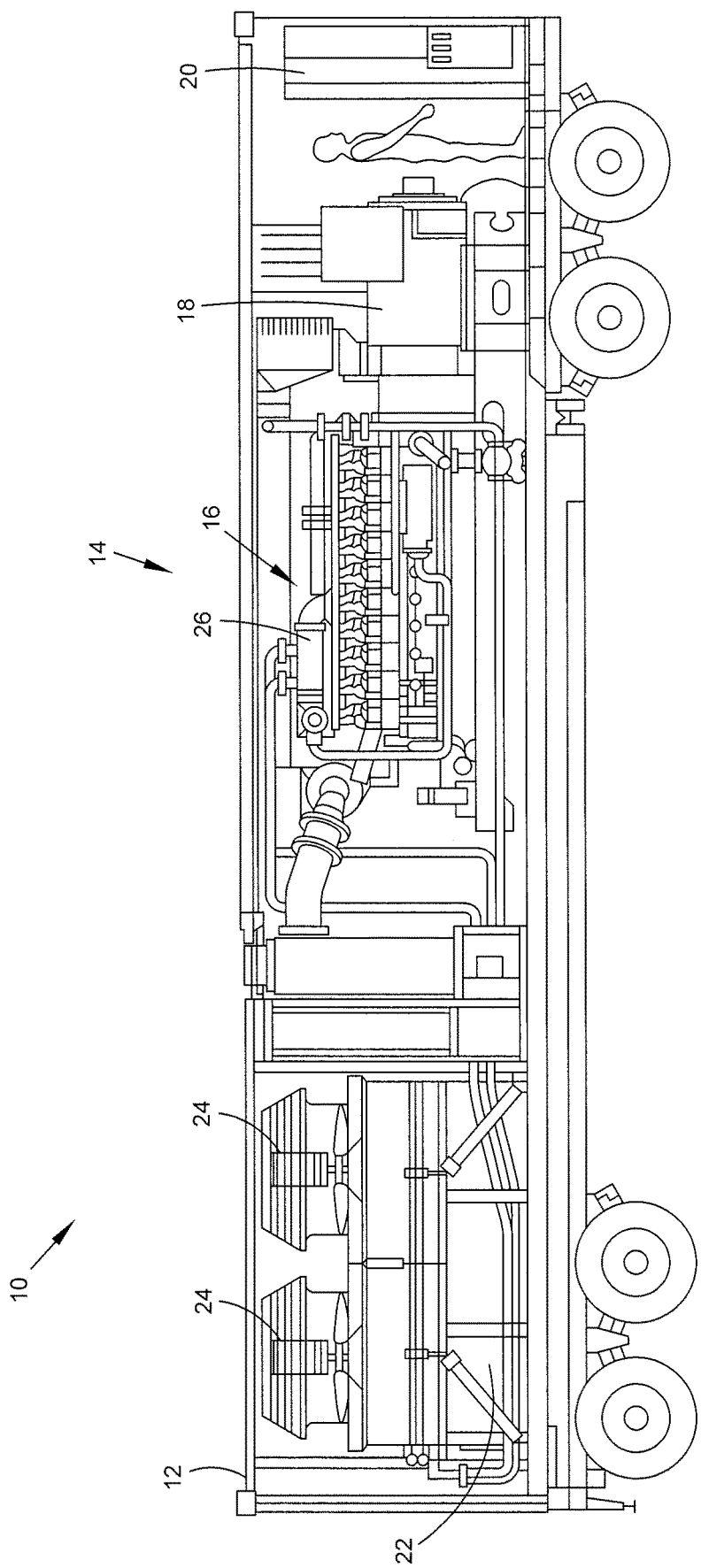
FIG. 1 is a cross-sectional side view of a containerized generator set having electrically driven exhaust fans.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

Containerized generator sets typically comprise a gaseous- or liquid-fueled engine coupled to an electrical generator. In order to maximize power output of the generator set while meeting the space demands of the container, containerized generator sets typically use an electrical fan for cooling. Electrical fans are able to provide sufficient cooling for most containerized generator set needs while only minimally loading the generator.

However, electrical fans come with drawbacks. First and foremost, electrical fans are limited in their volumetric flow rate, and thus are limited in the amount of cooling they are able to provide to the containerized generator set. Further, electrical fans can have or be perceived to have reliability problems. Repair and/or maintenance of an electrical fan typically requires an electrician, making the repair and/or maintenance both labor- and cost-intensive.

The present disclosure is therefore directed to an improved cooling system for a containerized generator set that overcomes the deficiencies noted above relating to electrical fan cooling systems. More specifically, the present disclosure is directed to a mechanical cooling fan and system to provide cooling to a containerized generator set.

Figure 2C:
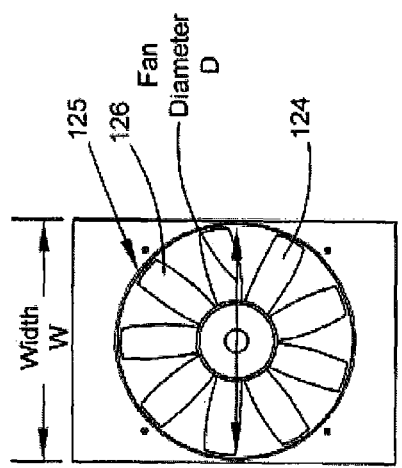
FIG. 2C is a cross-sectional end view of a containerized generator set having a vertically mounted and mechanically driven cooling fan in accordance with some embodiments of the present disclosure.
Figure 2B:
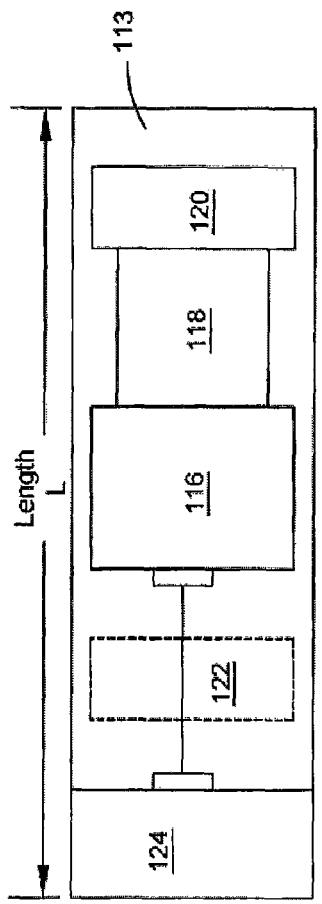
FIG. 2B is a cross-sectional top view of a containerized generator set having a vertically mounted and mechanically driven cooling fan in accordance with some embodiments of the present disclosure.
Figure 2A:
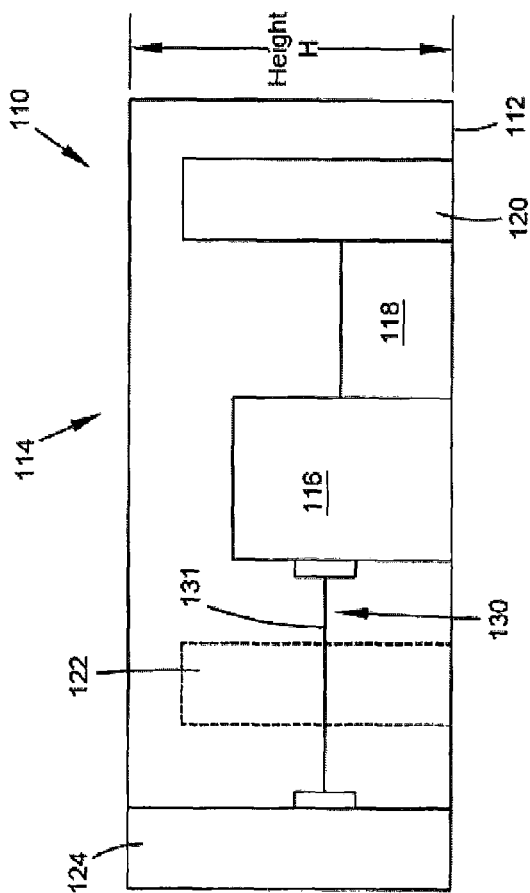
FIG. 2A is a cross-sectional side view of a containerized generator set having a vertically mounted and mechanically driven cooling fan in accordance with some embodiments of the present disclosure.

FIGS. 2A, 2B, and 2C provide side, top, and end profile views, respectively, of one embodiment of the present disclosure. In the disclosed embodiment, a containerized generator set 110 comprises a generator set 114, radiator 122, and at least one cooling fan 124 disposed within a container 112.

Container 112 defines and interior volume 113 having a length L, width W, and height H. In some embodiments, the interior volume 113 may be divided into compartments, such as, for example, an engine-generator compartment and a radiator compartment. In some embodiments, container 112 is dimensioned to meet International Standard Organization (ISO) standards (also known as specifications). For example, container 112 may comply with the dimensional standards for an ISO 20-, 30-, 40-, 48-, or 53-foot container.

Generator set 114 comprises an engine 116 and generator 118. Generator set 114 may further comprise a control panel 120 that provides a human-machine interface for controlling one or both of the engine 116 and generator 118. Engine 116 may be a reciprocating engine running on diesel, vapor, or liquid fuel.

A cooling fan 124 is disposed proximate one end of the container 112. In the illustrated embodiment of FIGS. 2A, 2B, and 2C, the cooling fan 124 is positioned to move air through the interior volume 113 in a primarily length-wise direction, which is to say that the cooling fan 124 is vertically oriented. In some embodiments the cooling fan 124 may be replaced with a fan assembly of more than one vertically-oriented cooling fans.

A radiator 122 is disposed between cooling fan 124 and engine 116. Radiator 122 is in fluid communication with an engine cooling jacket (not shown) that is used to cool the engine 116. In some embodiments, radiator 122 may further be in fluid communication with components used to cool generator 118 and/or control panel 120. A liquid coolant flowing through the radiator 122 and engine cooling jacket is cooled by air flow across the radiator 122. That air flow is driven by cooling fan 124.

Cooling fan 124 is mechanically driven by the engine 116 via a mechanical linkage 130. The mechanical linkage 130 may comprise one or more of a shaft, crankshaft, driveshaft, fan belt, pneumatic driver, hydraulic driver, clutch (visco-electric, electromagnetic, or pneumatic), transmission, and gear boxes. The mechanical linkage 130 may take any one of a number of configurations, such as those illustrated in FIGS. 2A through 5B and described in greater detail below.

An advantage of using a mechanically-driven cooling fan 124, as opposed to the electrically-driven fans of the prior art, is that the cooling fan 124 may be enlarged relative to an electrically-driven fan and may substantially fill a cross-section of the interior volume 113. For example, in the illustrated embodiment as can be seen in FIG. 2C, the cooling fan 124 may have a diameter that is substantially the same as the width W of the interior volume 113. In some embodiments, the cooling fan 124 may be dimensioned such that it substantially fills a width-by-height cross-section of the interior volume 113.

Cooling fan 124 has a swept cross-sectional area 125 that comprises a circle through which a fan blade 126 passes during fan operation. The cross-section is taken in a width by height dimension. In some embodiments, the swept cross-sectional area 125 of cooling fan 124 is at least 50% of the cross-sectional area of the interior volume 113. FIG. 2C, showing the end view of the containerized generator set 110, allows for an easy comparison of the rectangular width-by-height cross-sectional area of the interior volume 113 and the swept cross-sectional area 125 of cooling fan 124. In some embodiments where the container 112 is a high cube, the swept cross-sectional area 125 of cooling fan 124 may be at least 56% of the cross-sectional area of the interior volume 113. In some embodiments where the container 112 is a standard 8×8 ISO container, the swept cross-sectional area 125 of cooling fan 124 may be at least 65% of the cross-sectional area of the interior volume 113.

By dimensioning the cooling fan 124 to the maximum size allowed by the size constraints of the container 112, the cooling air flow may also be maximized. In containerized generator sets where cooling is the limiting factor for engine and/or generator size, a larger cooling fan 124 and consequently larger cooling airflow allows for the use of a larger engine-generator and, thus, a larger power output.

FIG. 7 is a schematic cross-sectional representation of the primary air flow through the containerized generator set 110 of FIGS. 2A, 2B, and 2C. Cooling fan 124 is configured to move air through the container 112 from one or more air inlets to one or more air exhausts or air exits. Airflow through the containerized generator set 110 is illustrated by Arrows A-1A, A-1B, A-2, A-3A, and A-3B. Air is drawn in through one or more air inlets 701 as shown by Arrows A-1A and A-1B. Inlets 701 may be apertures located in the top, side, or end walls of the container 112. Inlets 701 may be louvered, or may be covered by doors or covers when the generator set 114 is not in operation (e.g. during transportation of the containerized generator set 110).

In the illustrated embodiment, an inlet 701 is located in the top wall 702 of the container 112, as shown by Arrow A-1A, and another inlet 701 is located in the end wall 703 of container 112, as shown by Arrow A-1B. End wall 703 is disposed opposite the end wall 704 of container 112 having a cooling fan 124. An aperture in end wall 704, or an absence of end wall 704, comprises an air exhaust.

Air entering the container 112 is drawn across the radiator 122 to cool the coolant flowing there through, and thereby to effect cooling of the engine 116. Arrow A-2 illustrates the flow of air across the radiator 122. Air is then expelled from the container 112 at end wall 704 by passing through fan 124 and out of the container 112 as illustrated by Arrows A-3A and A-3B. In some embodiments end wall 704 is omitted from container 112, or is covered by a removable wall or door or cover such that during operation of the generator set 114 the end of the container 112 is completely open. In other embodiments, end wall 704 may be a partial wall that does not impede the flow of air through cooling fan 124 and out of container 112.

Collectively, FIGS. 2A through 5B illustrate several configuration options for the mechanical linkage 130. As described above, the mechanical linkage 130 couples the engine 116 to one or more cooling fans 124 via a shaft, crankshaft, driveshaft, fan belt, hydraulic driver, gear boxes, or similar implements, or a combination thereof. In some embodiments, a driveshaft of an engine is coupled to a hydraulic pump, and the fan is driven by hydraulic fluid pressurized by the hydraulic pump.

The mechanical linkage 130 may link an axis of rotation of a driveshaft coupled to the engine 116 to an offset axis of rotation of a secondary driveshaft of the fan 124. The offset between the two axis of rotation (of the primary driveshaft and the secondary driveshaft) may be vertically offset (i.e. height-wise), laterally offset (i.e. width-wise), or axially offset (i.e. length-wise), or some combination thereof. In embodiments having a radiator 122 disposed between the engine 116 and cooling fan 124 (such as the embodiment of FIGS. 2A, 2B, and 2C), the mechanical linkage 130 may pass through or be routed around the radiator 122.

FIGS. 2A, 2B, and 2C illustrate an embodiment of a mechanical linkage 130 that is not offset in any direction. Rather, a driveshaft of the engine 116 serves directly as a driveshaft 131 of cooling fan 124. The driveshaft 131 may be centered in the interior volume 113 length-, width-, or height-wise, or may be aligned with the centerline, or centerline axis, of the interior volume 113.

Figure 3B:
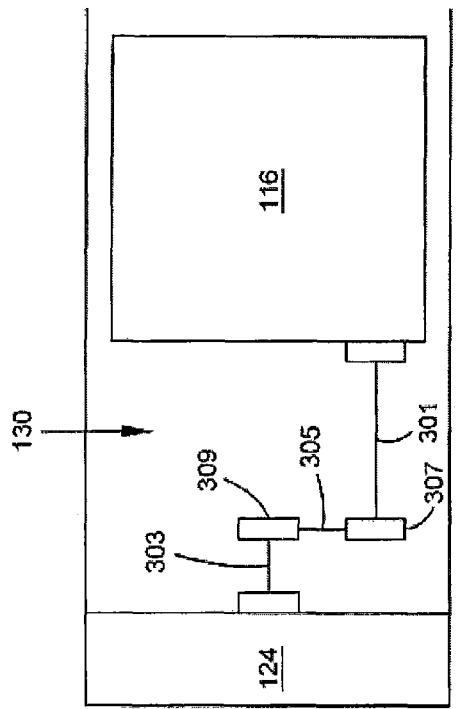
FIG. 3B is a cross-sectional partial top view of one configuration of a mechanical linkage between an engine and a cooling fan in accordance with some embodiments of the present disclosure.
Figure 3A:
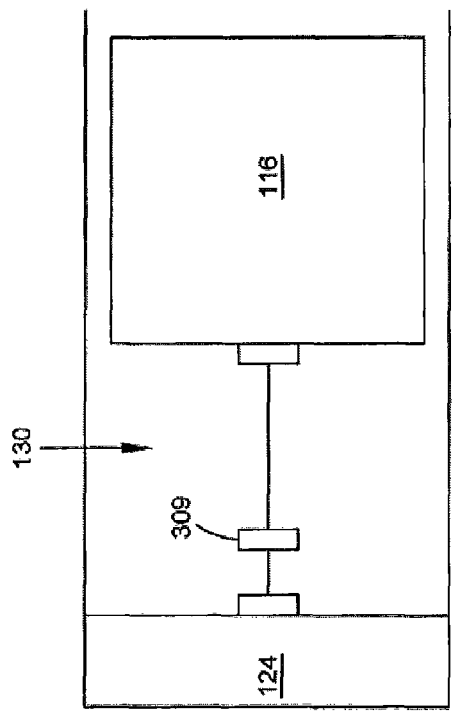
FIG. 3A is a cross-sectional partial side view of one configuration of a mechanical linkage between an engine and a cooling fan in accordance with some embodiments of the present disclosure.

FIGS. 3A and 3B provide side and top profile views, respectively, of an alternative configuration of a mechanical linkage 130. In the illustrated embodiment, the mechanical linkage 130 comprises a primary driveshaft 301 of engine 116, driveshaft 303 of cooling fan 124, and a fan belt 305. The mechanical linkage 130 couples the primary driveshaft 301 to the secondary driveshaft 303 via fan belt 305. Fan belt 305 may couple a first hub 307, carried by the primary driveshaft 301, to a second hub 309 carried by the secondary driveshaft 303.

The illustrated linkage achieves a vertical offset, in that the secondary driveshaft 303 is vertically or height-wise displaced from the primary driveshaft 301. In other embodiments, such a vertical offset may be achieved using additional shafts and gears or gearboxes. Stated differently, the primary driveshaft 301 defines a first axis of rotation A1 and the secondary driveshaft 303 defines a second axis of rotation A2. As shown in FIG. 3A, the first axis of rotation A1 is vertically offset from the second axis of rotation A2. The offsets described further below operate under the same principle.

Figure 4B:
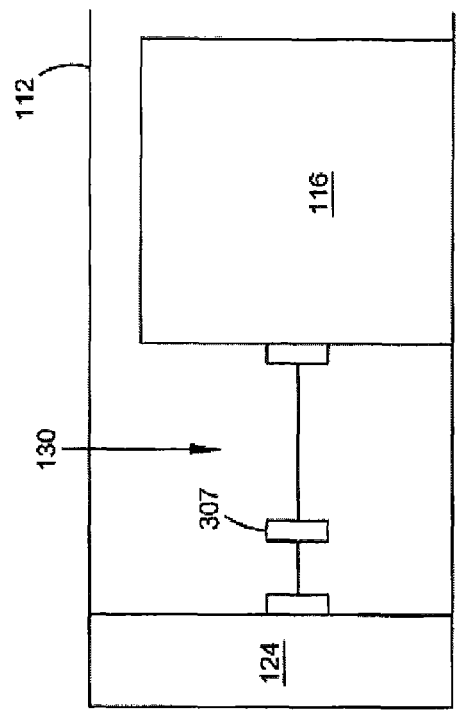
FIG. 4B is a cross-sectional partial top view of one configuration of a mechanical linkage between an engine and a cooling fan in accordance with some embodiments of the present disclosure.
Figure 4A:
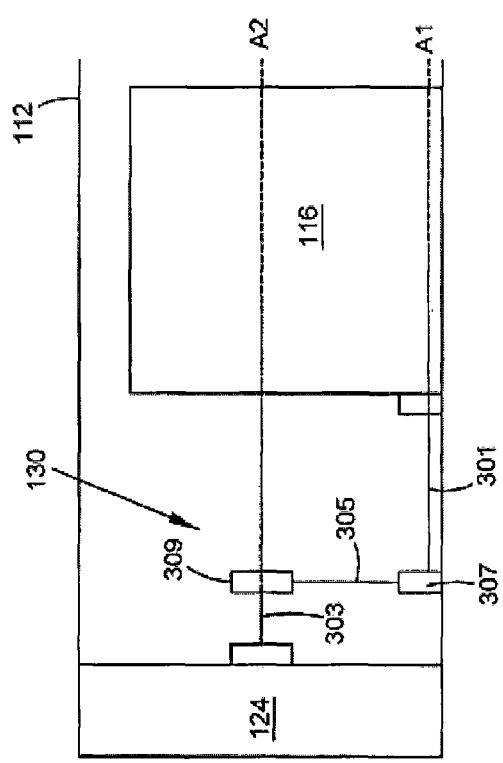
FIG. 4A is a cross-sectional partial side view of one configuration of a mechanical linkage between an engine and a cooling fan in accordance with some embodiments of the present disclosure.

FIGS. 4A and 4B provide side and top profile views, respectively, of an alternative configuration of a mechanical linkage 130. In the illustrated embodiment, the mechanical linkage 130 comprises a primary driveshaft 301 of engine 116, secondary driveshaft 303 of cooling fan 124, and a fan belt 305. The mechanical linkage 130 couples the primary driveshaft 301 to the secondary driveshaft 303 via fan belt 305. Fan belt 305 may couple a first hub 307, carried by the primary driveshaft 301, to a second hub 309 carried by the secondary driveshaft 303. The illustrated linkage achieves a lateral offset, in that the secondary driveshaft 303 is laterally or width-wise displaced from the primary driveshaft 301. In other embodiments, such a lateral offset may be achieved using additional shafts and gears or gearboxes.

FIGS. 5A and 5B provide side and top profile views, respectively, of an alternative configuration of a mechanical linkage 130. In the illustrated embodiment, the mechanical linkage 130 comprises a primary driveshaft 301 of engine 116, secondary driveshaft 303 of cooling fan 124, and a fan belt 305. The mechanical linkage 130 couples the primary driveshaft 301 to the secondary driveshaft 303 via fan belt 305. Fan belt 305 may couple a first hub 307, carried by the primary driveshaft 301, to a second hub 309 carried by the secondary driveshaft 303. The illustrated linkage achieves a vertical and lateral offset, in that the secondary driveshaft 303 is vertically or height-wise displaced as well as laterally or width-wise displaced from the primary driveshaft 301. In other embodiments, such an offset may be achieved using additional shafts and gears or gearboxes.

Additional configurations of the mechanical linkage 130 beyond those illustrated in FIGS. 2A through 5B are hereby contemplated to effect offset between a driveshaft axis of rotation and a fan driveshaft axis of rotation.

Figure 6B:
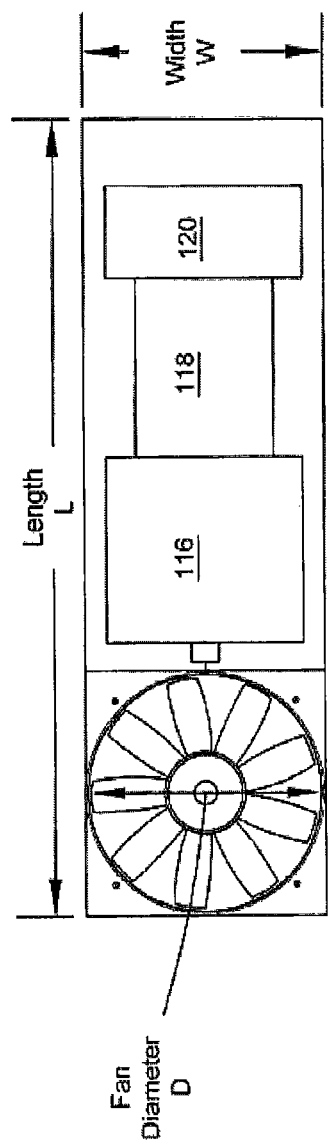
FIG. 6B is a cross-sectional top view of a containerized generator set having a horizontally mounted and mechanically driven cooling fan in accordance with some embodiments of the present disclosure.
Figure 6C:
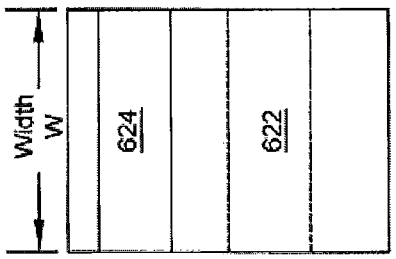
FIG. 6C is a cross-sectional side view of a containerized generator set having a horizontally mounted and mechanically driven cooling fan in accordance with some embodiments of the present disclosure.
Figure 6A:
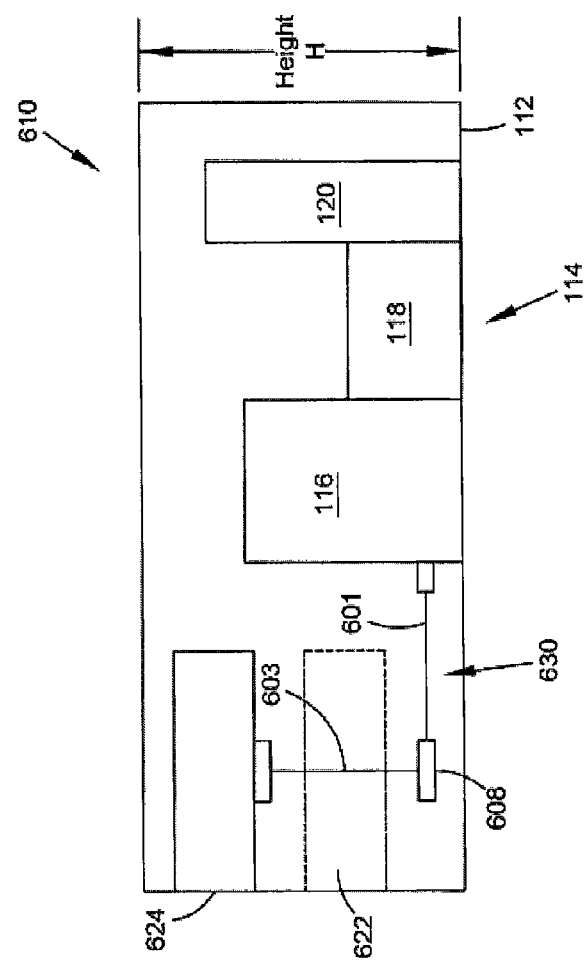
FIG. 6A is a cross-sectional side view of a containerized generator set having a horizontally mounted and mechanically driven cooling fan in accordance with some embodiments of the present disclosure.

FIGS. 6A, 6B, and 6C provide side, top, and end profile views, respectively, of one embodiment of the present disclosure. In the disclosed embodiment, a containerized generator set 610 comprises a generator set 114, radiator 622, and at least one cooling fan 624 disposed within a container 112.

A cooling fan 624 is disposed proximate one end of the container 112. In the illustrated embodiment of FIGS. 6A, 6B, and 6C, the cooling fan 624 is positioned to move air through the interior volume 113 in both a length-wise and a height-wise direction, which is to say that the cooling fan 624 is horizontally oriented. In some embodiments the cooling fan 624 may be replaced with a fan assembly of more than one horizontally-oriented cooling fans.

A radiator 622 is disposed vertically below cooling fan 624 and proximate the same end of the container 112. Radiator 622 is in fluid communication with an engine cooling jacket (not shown) that is used to cool the engine 116. In some embodiments, radiator 622 may further be in fluid communication with components used to cool generator 118 and/or control panel 120. A liquid coolant flowing through the radiator 622 and engine cooling jacket is cooled by air flow across the radiator 622. That air flow is driven by cooling fan 624.

Cooling fan 624 is mechanically driven by the engine 116 via a mechanical linkage 630. The mechanical linkage 630 may comprise one or more of a shaft, crankshaft, driveshaft, fan belt, hydraulic driver, and gear boxes. The mechanical linkage 630 may take any one of a number of configurations, such as those illustrated in FIGS. 2A through 5B and described above. More specifically, the mechanical linkage 630 may achieve vertical, lateral, or axial offsets between a driveshaft of the engine 116 and driveshaft of the cooling fan 124.

In the illustrated embodiment, the mechanical linkage 630 comprises a primary driveshaft 601 of the engine 116 coupled to a secondary driveshaft 603 of the cooling fan 624 via a gearbox 608. The secondary driveshaft 603 may be perpendicular to the primary driveshaft 601, the centerline or centerline axis of the container 112, or both. The driveshaft defines a first axis of rotation A1, and the driveshaft defines a second axis of rotation A2. First axis of rotation A1 may be perpendicular to second axis of rotation A2.

As can be seen in FIG. 6B, the cooling fan 624 may have a diameter that is substantially the same as the width W of the interior volume 113. By dimensioning the cooling fan 624 to the maximum size allowed by the size constraints of the container 112, the cooling air flow may also be maximized.

FIG. 8 is a schematic cross-sectional representation of the primary air flow through the containerized generator set 610 of FIGS. 6A, 6B, and 6C. Cooling fan 624 is configured to move air through the container 112 from one or more air inlets to one or more air exhausts or air exits. Airflow through the containerized generator set 610 is illustrated by Arrows A-1A, A-1B, A-2, A-3A, and A-3B. Air is drawn in through one or more air inlets 701 as shown by Arrows A-1A and A-1B. Inlets 701 may be apertures located in the top, side, or end walls of the container 112. Inlets 701 may be louvered, or may be covered by doors or covers when the generator set 114 is not in operation (e.g. during transportation of the containerized generator set 610).

In the illustrated embodiment, an inlet 701 is located in the top wall 702 of the container 112, as shown by Arrow A-1A, and another inlet 701 is located in the end wall 703 of container 112, as shown by Arrow A-1B. End wall 703 is disposed opposite the end wall 704 of container 112 having a cooling fan 624.

Air entering the container 112 is drawn across the radiator 622 to cool the coolant flowing there through, and thereby to effect cooling of the engine 116. Arrow A-2 illustrates the flow of air across the radiator 622. Air is then expelled from the container 112 through top wall 702 by passing through fan 624 and out of the container 112 as illustrated by Arrows A-3A and A-3B. In some embodiments an air exit 705 is provided that may be covered by a removable wall or door or cover such that during operation of the generator set 114 the air exit 705 of the container 112 is open.

One advantage of containerized generator sets is their modularity. Containerized generator sets may be transported to a site requiring electrical power and configured to meet the demand. For example, in applications where multiple containerized generator sets are required to meet electrical demand, one or more containerized generator sets may be stacked vertically, or may be otherwise connected to meet the need.

Figure 9:
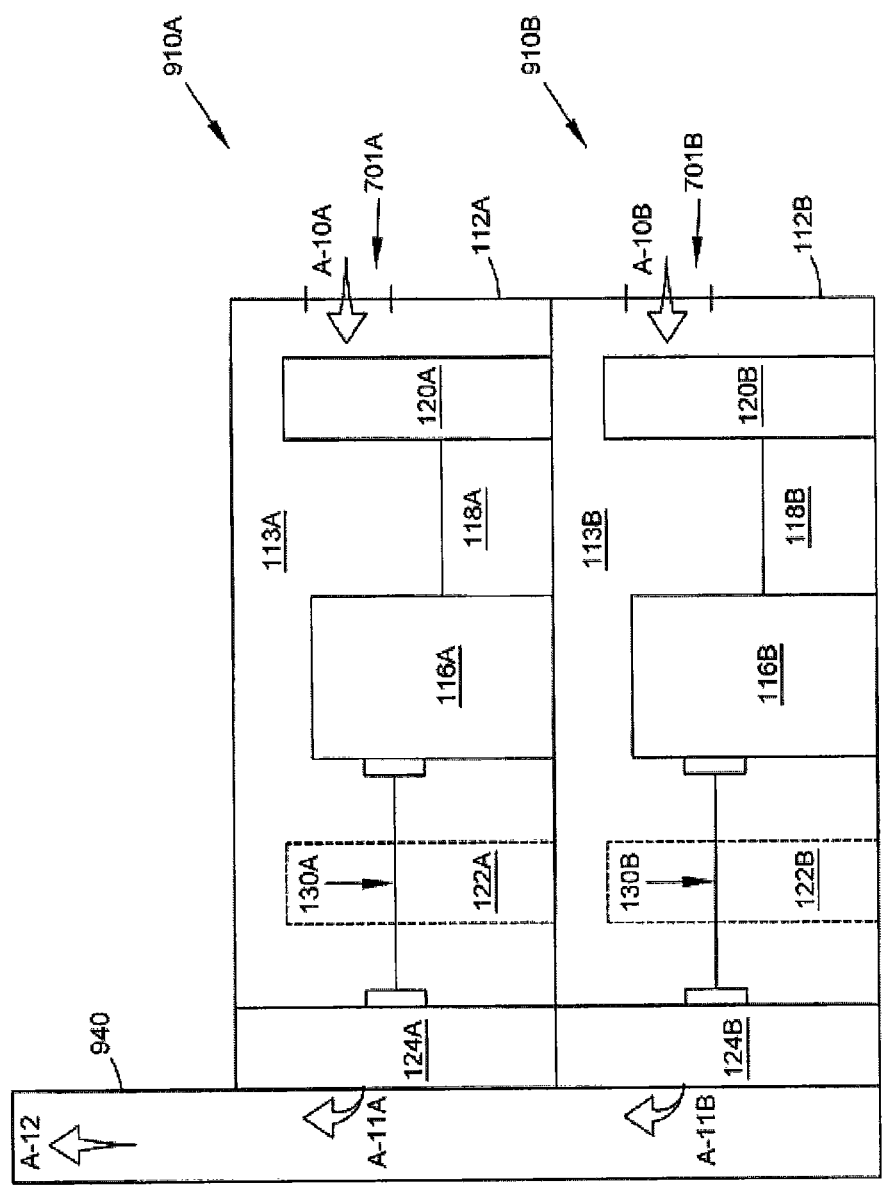
FIG. 9 is a cross-sectional side view of a pair of stacked containerized generator sets having a vertically mounted and mechanically driven cooling fans and a common exhaust duct in accordance with some embodiments of the present disclosure.

FIG. 9 provides a cross-sectional view of two containerized generator sets stacked vertically together and sharing a common exhaust duct. A first containerized generator set 910A is stacked on top of a second containerized generator set 910B. First and second containerized generator sets 910A, 910B each respectively comprise a generator set 114A/B, radiator 122A/B, and cooling fan 124A/B disposed within a container 112A/B that defines an interior volume. Generator set 114A/B comprises an engine 116A/B and generator 118A/B, and a control panel 120A/B is included. A mechanical linkage 130A/B couples the engine 116A/B to cooling fan 124A/B.

First and second containerized generator sets 910A, 910B exhaust cooling air to a common exhaust air plenum 940. The common exhaust air plenum 940 may be vertically oriented and channel exhaust cooling air away from the respective air inlets of the first and second containerized generator sets 910A, 910B. Common exhaust air plenum 940 allows for a smaller footprint per unit of electrical generation because it allows for multiple containerized generator sets 910A, 910B to be located in close proximity and/or stacked upon each other. The smaller footprint and exhaust channeling may additional result in a cost savings.

The presently-disclosed systems have numerous advantages over the prior art. First and foremost, and as described above, the use of a mechanically-driven cooling fan allows for the use of a larger fan, creates a larger cooling capacity, and therefore allows for the use of a larger engine in the containerized generator set. With traditional, prior art implementations that use mechanically driven fans, a smaller power output would be recognized in the same footprint or container size. This is especially true for containerized generator sets with an output of 1 MWe or greater. The cooling provided relative to the load incurred by a mechanically-driven fan is substantially better than for an electrically-driven fan. For example, in some implementations sufficient cooling is achieved for a 2,000 kWe generator set with only a 100 kW fan load equivalent. Mechanically driven fans may, in some implementations, also be less expensive to manufacture.

Mechanically driving the cooling fan has an added advantage of generally being simpler to maintain and repair the system. Maintenance and repair costs may further be reduced as those actions may be performed by a mechanic rather than an electrician.

The containerized generator sets disclosed herein are rapidly deployable and, in embodiments using ISO standard containers, are easily transportable using standard truck, rail, air, or ship transportation. Indeed, the use of ISO containers allows for the use of standardized transportation modes instead of oversized loads that can dramatically increase the cost of moving the containerized generator set.

The disclosed systems further provide modularity; the sets are easy to customize, configure, and scale according to electrical demands. In some embodiments a separate container may be provided that contains a control module to control all electrical gear on site. This separate container may be coupled or attached to one or more of the containerized generator sets, allowing for a complete plug-and-play modularity that can be scaled up or down as needed.

The present application discloses one or more of the features recited in the appended claims and/or the following features which, alone or in any combination, may comprise patentable subject matter.

Although examples are illustrated and described herein, embodiments are nevertheless not limited to the details shown, since various modifications and structural changes may be made therein by those of ordinary skill within the scope and range of equivalents of the claims.

What is claimed is:

1. A system for generating electrical power comprising:
   a container defining an interior volume having a length, width, and height;
   a generator set disposed within the interior volume, the generator set having a first driveshaft defining a first axis of rotation mechanically coupled to a second driveshaft defining a second axis of rotation, wherein the first axis of rotation is parallel to and offset from the second axis of rotation;
   a fan disposed within the interior volume and mechanically coupled to the generator set via the second driveshaft, the fan having a swept cross-sectional area comprising a circle through which a fan blade passes during fan operation, wherein the swept cross-sectional area is at least 50% of the cross-sectional area of the interior volume; and
   a radiator disposed within the interior volume between the generator set and the fan, wherein the radiator defines a first side facing the generator set and a second side facing the fan, and wherein the second driveshaft passes through the radiator from the first side of the radiator to the second side of the radiator.

2. The system of claim 1 wherein a diameter of said fan is substantially the same as the width of the interior volume.

3. The system of claim 1 wherein said container is dimensioned to meet ISO specifications.

4. The system of claim 1 wherein said fan is disposed proximate an end of said container.

5. The system of claim 1 wherein said fan is oriented to move air through the container in a primarily length-wise direction.

6. A system for generating electrical power comprising:
   a first containerized generator comprising:
      a container defining an interior volume;
      a generator set disposed within the interior volume, the generator set having a first driveshaft defining a first axis of rotation mechanically coupled to a second driveshaft defining a second axis of rotation, wherein the first axis of rotation is parallel to and offset from the second axis of rotation; and
      a fan disposed within the interior volume and mechanically coupled to the generator set via the second axis of rotation; and
   a second containerized generator stacked on top of the first containerized generator and comprising:
      a container defining an interior volume;
      a generator set disposed within the interior volume; and
      a fan disposed within said interior volume and mechanically coupled to the generator set;
   wherein the fan of each of the first containerized generator and the second containerized generator is oriented to move air through the container in a primarily length-wise direction,
   wherein the first containerized generator and the second containerized generator share a common, vertically-oriented exhaust duct disposed proximate to ends of the first and the second containerized generator such that air flows into the common, vertically-oriented exhaust duct from the ends of the first and the second containerized generators.

7. The system of claim 6 wherein the respective interior volume of each of said first containerized generator and said second containerized generator has a length, a width, and a height, and wherein a diameter of said fan is substantially the same as said width of said interior volume.

8. The system of claim 7 wherein said fan of each of said first containerized generator and said second containerized generator substantially fills a width-by height cross-section of the interior volume.

9. The system of claim 6 wherein each of said first and said second containerized generators further comprise a driveshaft coupled to said generator and defining a first axis of rotation, and said fan of each of said first containerized generator and said second containerized generator having a second axis of rotation; wherein said second axis of rotation is offset from said first axis of rotation.

10. The system of claim 9 wherein said second axis of rotation is aligned with a centerline axis of said respective container.

11. The system of claim 9 wherein said second axis of rotation is perpendicular to a centerline axis of said respective container.

* * * * *